(12) United States Patent
Verma (10) Patent No.: US 8,122,505 B2
(45) Date of Patent: Feb. 21, 2012

(54) METHOD AND APPARATUS FOR DETECTION OF MALICIOUS BEHAVIOR IN MOBILE AD-HOC NETWORKS

(75) Inventor: Dinesh Verma, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 1033 days.

(21) Appl. No.: 11/840,844

(22) Filed: Aug. 17, 2007

(65) Prior Publication Data

US 2009/0049546 A1    Feb. 19, 2009

(51) Int. Cl.
*G06F 11/00* (2006.01)
(52) U.S. Cl. ............................................ 726/23; 726/22
(58) Field of Classification Search .............. 726/22–25; 713/188; 455/410, 411
See application file for complete search history.

(56) References Cited

U.S. PATENT DOCUMENTS

| | | | |
|---|---|---|---|
| 7,082,117 B2* | 7/2006 | Billhartz | 370/338 |
| 7,177,594 B2* | 2/2007 | Burr | 455/41.2 |
| 7,409,719 B2* | 8/2008 | Armstrong et al. | 726/24 |
| 2003/0163729 A1* | 8/2003 | Buchegger | 713/201 |
| 2006/0133289 A1* | 6/2006 | Golle et al. | 370/252 |
| 2006/0136720 A1* | 6/2006 | Armstrong et al. | 713/164 |
| 2006/0206300 A1* | 9/2006 | Garg et al. | 703/27 |
| 2008/0016570 A1* | 1/2008 | Capalik | 726/23 |

\* cited by examiner

*Primary Examiner* — Nirav B. Patel
(74) *Attorney, Agent, or Firm* — August Law, LLC; George Willinghan (57) ABSTRACT

Systems and methods are provided for detecting malicious behavior in mobile ad-hoc wireless networks. The mobile ad-hoc network contains a plurality of actual nodes and a plurality of decoys that are derived from the actual nodes using duplicate instances of the operational software of the actual nodes in combination with a virtual interconnection topology created to make the decoys appear as actual nodes within the mobile ad-hoc network. The interconnection topology includes routing characteristics indicating that the most efficient path of communication to any given decoy is through at least one actual node in the network. The decoys are used to identify malicious behavior in the network and in particular to identify attempt to communicate directly with decoys in contradiction to the created interconnection topology. When the malicious behavior is associated with an identifiable node, corrective action is taken that includes quarantining that node from the other nodes in the network.

20 Claims, 5 Drawing Sheets

METHOD AND APPARATUS FOR DETECTION OF MALICIOUS BEHAVIOR IN MOBILE AD-HOC NETWORKS

STATEMENT REGARDING FEDERALLY SPONSORED RESEARCH

The invention disclosed herein was made with U.S. Government support under Contract No. W911NF-06-3-0001 awarded by the U.S. Army Research Laboratories. The Government has certain rights in this invention.

FIELD OF THE INVENTION

The present invention relates to the field of computer communication networks, and specifically to the subfield of detection of malicious behavior in communication networks.

BACKGROUND OF THE INVENTION

A mobile ad-hoc network (MANET) is a communication network formed among a plurality of computer nodes that do not have a fixed location and are movable. These computer nodes can be located on moving vehicles, e.g. buses, trucks, tanks, or airplanes, or can be small devices that are carried by civilians, soldiers or animals. A MANET is formed without any hierarchy for central control and coordination and is intended to facilitate communication among the nodes contained in the MANET. These nodes do not necessarily have any other infrastructure support. For example, ten employees of a single company meet an airport, and the mobile devices carried by each employee, i.e., laptop computers, cellular phones and personal digital assistances, constitute the nodes in a MANET from among the ten employees. This MANET does not use the infrastructure provided to them by the airport, e.g., a broadcast WIFI system. A reason for not using the infrastructure could be security concerns or corporate requirements that employees do not use such public networks. Similarly, a convoy contains a plurality of vehicles moving in an isolated region, and each vehicle contains an on-board computer that is one of the nodes of a MANET that facilitates communication among the convoy vehicles. The MANET reforms itself as vehicles in the convoy shift their positions relative to each other.

Although a MANET provides important functions and is valuable in many cases, the MANET is more susceptible to security attacks and vulnerabilities. Because the nodes cannot rely on a fixed infrastructure, the presence of a corrupted or malicious node in the MANET can cause serious problems for the secure operation of the other nodes. Several attempts have been made to address the issue of secure operation of a MANET. The current state of the art in MANET security uses intrusion detection systems. These intrusion detection systems identify the statistical properties of the expected pattern of communication among the nodes in the MANET. The expected pattern of statistical properties can be described using a state transition model and intrusion detection is based on detecting statistical anomalies in expected behavior of the system. Statistical models that use a notion of normal behavior and detection of aberrant behavior can identify potentially malicious nodes. Some current MANET systems also associate concepts of trust and reputation with various nodes in the network. Therefore, improperly behaving nodes in the MANET receive a bad associated reputation and can be excluded from the network.

While statistical analysis is a reasonable approach to follow for detecting malicious behavior in a MANET, statistical analysis suffers from several limitations. Because a MANET is constantly reforming, a good baseline, which can define the usual operating pattern for any node, can be difficult to establish. Due to rapid changes in the state of the network, a large number of false positives can be generated where perfectly normal nodes may be characterized as being malicious. The problem with false positives is significant in wired networks with fixed topology using the same approach and becomes even more acute in a MANET. Therefore, better schemes are needed to identify malicious behavior in a MANET. These schemes would produce a significantly lower number of false positive than methods based on statistical analysis of usage patterns.

SUMMARY OF THE INVENTION

The present invention is directed to systems and methods for identifying malicious behavior in a wireless network and in particular in a mobile ad-hoc network (MANET). These systems and methods leverage the technology of creating different copies of a computer software system on the same machine, for example, using technologies such as a hypervisor. A hypervisor is a platform that facilitates a plurality of operating systems running simultaneously on a single host computer. Therefore, the hypervisor creates the illusion of multiple operating systems running on a single hardware platform, e.g., four copies of a computer system running windows on the a single machine or two copies of a windows operating system and two copies of a Linux system on a single machine. Hypervisors enable creation of virtual systems on physical hardware. In the present invention, each node of the MANET uses the hypervisor technology to create one or more virtual machines on one or more of the plurality of nodes within the network. On any given node within the MANET, only one real system exists, and the other systems or virtual machines are merely decoys. These decoys are used to detect the presence of malicious users within the MANET. In an alternative embodiment, different decoys of a given node are run on each one of a plurality of cores within a multi-core processor.

The node decoys are advertised to the external community as instances of a real node. The nature of the transmission links between the decoys and the actual nodes are modified so that both the decoys and the actual nodes appear, to anyone external to the MANET, to be multiple independent nodes moving independently of each other. However, the movements are actually constrained so that each decoy is only reachable through an associated real or actual node.

In the normal operation of the MANET, the configuration of each decoy is set up so that external nodes are not expected to try to communicate directly with the decoys, and no route to a decoy should go outside, i.e., bypass, the real system on that node. Therefore, any node that makes an inappropriate access to a decoy is flagged as a malicious node and restricted from the MANET. For example, if an external node attempts to send a routing update that makes one of the decoys closer to the that external node than the associated real system, this routing update attempt indicates an attempt to control or manipulate the routing tables in the decoy. One may view this as each node carrying several virtual honeypots along with it whenever it moves, since the decoys are resources that are being set up to be attacked by the external node. Upon detection, the malicious external node is contained using any one of the plurality of actions. These actions include assignment of a low reputation to the malicious external node and quarantining the external node from further communication with other nodes within the MANET.

In accordance with one exemplary embodiment, the present invention is directed to a method for detecting malicious behavior in a mobile ad-hoc network. The mobile ad-hoc network contains a plurality of actual nodes that move relative to each other. Each node contains an actual instance of the operating software for that node. These nodes can be contained on a single hardware platform or can be distributed across a plurality of hardware platforms. In one embodiment, a decoy instance, i.e., a duplicate, of the actual node operating software on an actual node in a mobile ad-hoc network is established. Alternatively, a plurality of decoy instances of the actual node operating software on the actual node is established. Suitable methods for establishing decoy instances include using a hypervisor disposed on the actual node.

Communications involving each decoy instance are monitored to identify malicious behavior within the mobile ad-hoc network. In one embodiment, a virtual interconnection topology containing each one of the plurality of decoy instances in the mobile ad-hoc network is created. For example, an appearance of relative motion between two decoy nodes containing two decoy instances in the plurality of decoy instances is created. Creation of the virtual interconnection topology includes modifying characteristics of the virtual interconnection topology. In one embodiment, establishing the decoy instance includes establishing a communication routing scheme among an external node and the decoy instance in the mobile ad-hoc network such that the most efficient path for the external node to communicate with the decoy passes through a real system instance of the node operating software on the actual node on which the decoy instance is established.

In one embodiment, monitoring communications involving the established decoy instance to identify malicious activity includes identifying attempts to communicate with the decoy instance in violation of an established communication routing scheme. In one embodiment, monitoring communications involving the established decoy to identify malicious behavior includes identifying a malicious node within the mobile ad-hoc network that is associated with the malicious behavior. Having identified the malicious node various corrective measures can be taken including quarantining the identified malicious node, establishing access filters between the identified malicious node and other nodes in the mobile ad-hoc network, associating a reputation with the identified malicious node indicating that the malicious node is not a trusted node and combinations thereof.

In one embodiment, access to the decoy instance is tracked when a new actual node is added to the mobile ad-hoc network. Tracking of access to the decoy instance when a new actual node is added further includes communicating actual delay and loss characteristics to the new node for communications between the new node and a real system instance of the node operating software on an actual node in the mobile ad-hoc network. In addition, modified delay and loss characteristics are communicated to the new node for communications between the new node and the decoy instance. The modified delay and loss characteristics include an added amount of delay and loss such that the modified delay and loss characteristics exceeds the actual delay and loss characteristics for communications between the new node and the real system instance on the actual node.

In one embodiment, for detecting malicious behavior in a mobile ad-hoc network, a plurality of decoy instances of the actual node operating software is established on one of a plurality of actual nodes in a mobile ad-hoc network. In addition, a virtual interconnection topology is created among the plurality of decoy instance and the plurality of actual nodes in the mobile ad-hoc network, and the established decoy instances and the virtual interconnection topology are used to identify malicious behavior within the mobile ad-hoc network. The virtual interconnection topology includes communication links to one or more of the decoy instances such that the communication links include at least one of a plurality of real system instances on actual nodes, a plurality of decoy instances or at least one real system instance on an actual node and at least one decoy instance.

The present invention is also directed to a node in a mobile ad-hoc network that includes at least one real system instance of the operating software for the node, at least one decoy instance of the operating software a topology manager to manage connectivity among external nodes and the decoy instance and an access tracker to monitor malicious behavior in the mobile ad-hoc network containing the node. In one embodiment, the node includes a plurality of decoy instances of the operating software, and a virtual interconnection topology among the decoy instances and the real system instance of the operating software.

DETAILED DESCRIPTION

Figure 1:
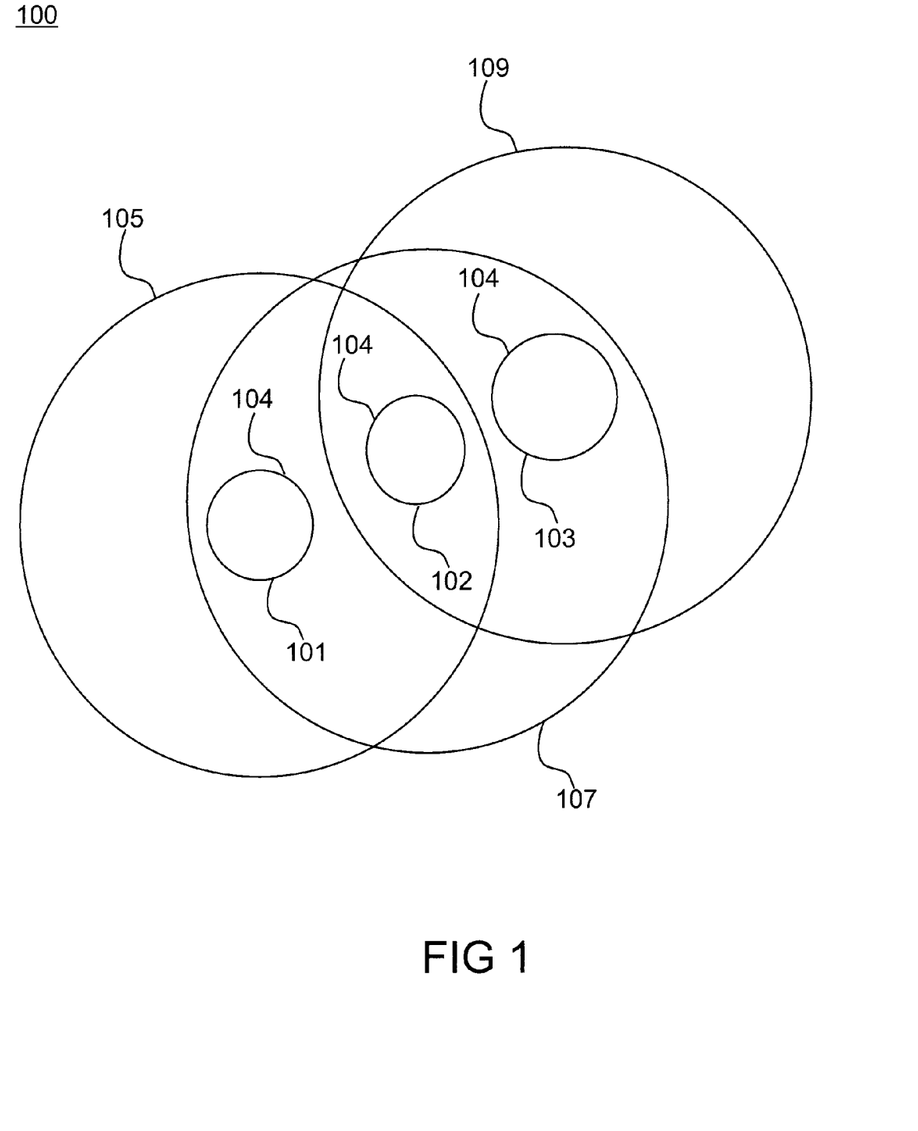
FIG. 1 is a schematic representation of an embodiment of a mobile ad-hoc wireless network.

Referring initially to FIG. 1, an exemplary embodiment of a distributed mobile ad-hoc network (MANET) 100 is illustrated. The MANET includes a plurality of actual nodes 104 in communication with each other through mobile or wireless communication links. Suitable wireless communication links are known and available in the art. In one embodiment, each actual node can communicate with all other actual nodes that are within a given communication range of that node. Suitable MANETs for use in accordance with the present invention include, but are not limited to, communication networks among vehicles moving on a highway, communication networks among handheld devices of a troop of soldiers that are going out on a foot patrol, sensor networks monitoring the status and location of a herd of animals, communication networks among airplanes and a communication group formed among a set of company employees who are out at a retreat. The actual nodes in the MANET can be disposed on one or more hardware platforms. Suitable hardware platforms include, but are not limited to, computing systems including personal computers, laptop computers, personal digital assistants and cellular phones. Each actual node runs an instance of operating software that provides the necessary functionality including communication functionality for that actual node.

The MANET facilitates communication among the actual nodes within the network for purposes of exchanging data. Any given node will look for other nodes within the network with which that node can communicate and will determine based on the communication characteristics, i.e., delay and loss, how to route messages through the network. Therefore, a given node will determine the nodes with which it communicates directly and the nodes with which it communicates through intermediary nodes. As illustrated, a first node 101 can communicate directly with all nodes that are within a first communication range 105. Therefore the first node 101 is in direct communication with a second node 102. The second node 102 can communicate directly with all nodes that are within a second communication range 107. Therefore, the second node 102 can communicate directly with the first node 101 and a third node 104. The third node 103 can communicate directly with all the nodes that are within a third communication range 109. Therefore, the third node can communicate directly with the second node. Nodes that can not directly communicate with each other communicate through other intermediaries, i.e., other nodes. Therefore, the second node 102 can forward packets sent out by the first node 101 to the third node 103, because the second node can communicate directly with both the first node and the third node. Each node in the MANET forwards data packets to the other nodes in the MANET. The MANET includes a routing scheme that determines how each node forwards packets to every other node, e.g., directly or through intermediary nodes, so that each node within the MANET can communicate with every other node.

In one embodiment, a MANET is formed among a set of users or nodes that have an established level of trust or some type of authenticated prearrangement to communicate with each other. As the number of nodes in a MANET grows, assuring the authenticity and goodwill of all of the nodes or members of the network becomes increasingly difficult. For example, if one of a plurality of foot patrol soldiers is captured by an enemy, that enemy may attempt to use the captured soldier's communication device to monitor the activities of the other soldiers. A corporate spy may attempt to intercept or to join the communication among employees of a competitor. In general, a malicious user uses different attacks to disrupt the operations of the MANET. One type of attack sends spurious traffic to be forwarded to nodes in the network in order to overload the network nodes. Another type of attack manipulates the network routing tables to direct data traffic that is passing between a targeted pair of nodes through the malicious node. Therefore, the malicious node can analyze and monitor the data stream that is passing through the targeted pair of nodes.

Assurability for secure communication among the nodes in the MANET requires the ability to determine when a node is behaving in a suspicious manner and to take the necessary corrective actions. Because the topology of the MANET changes over time as nodes move, enter and leave the network, suspicious patterns in the nodes are difficult to recognize and analyze. Systems and methods in accordance with the present invention provide a mechanism to identify the existence of any malicious node within a MANET.

Figure 2:
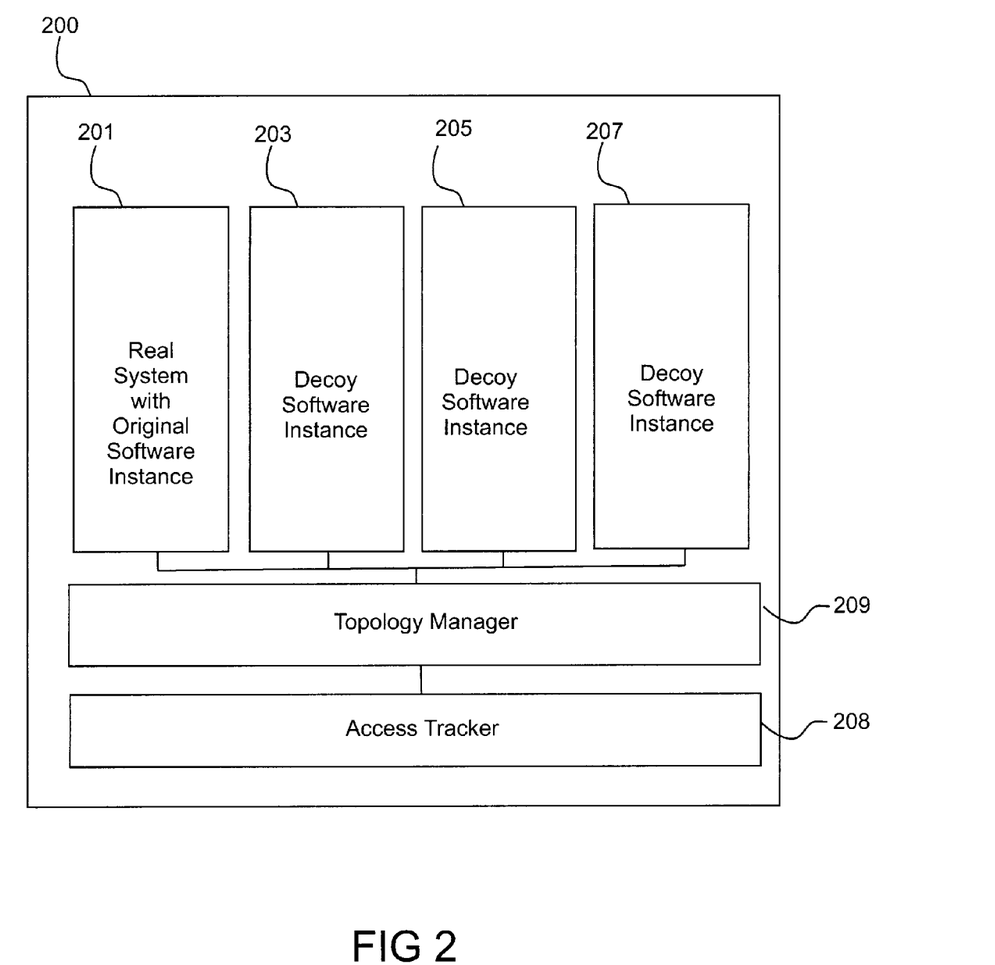
FIG. 2 is a schematic representation of a node in a mobile ad-hoc wireless network.

Referring to FIG. 2, an exemplary embodiment of an actual node 200 for use in a MANET in accordance with the present invention is illustrated. The node includes an original instance of the real system 201 that runs on the node. In addition, at least one and preferably a plurality of decoy instances 203, 205, 207 are established to run at the node. Suitable methods for establishing the decoys include using a hypervisor as would be available to and understood by one of skill in the art. Each one of the plurality of decoys runs on the same actual node and the hardware platform on which that node is located. However, each decoy is established to appear as a separate, independent and fully operational node within the MANET. These nodes are not actual nodes within the MANET but are decoys or decoy nodes. In one embodiment, an actual node contains more than one real system, i.e. more than one original software instance, operating concurrently, with or without decoys.

In order to create the decoys and to manage the decoy nodes to appear as actual nodes in the MANET, the actual node includes at least one topology manager 209. In one embodiment, the topology manager, in order to establish the appearance of each decoy as a node in the MANET, creates a virtual interconnection topology among the decoys and the real system at the actual node and provides the illusion of many nodes with that virtual interconnection topology to other nodes in the MANET. This virtual topology is established to make the decoy software instances on an actual node appear to be not only software instances but actual nodes within the MANET. Therefore, the interconnection topology makes all decoys on any given actual node in the MANET appear to be a plurality of actual nodes. Suitable interconnection topologies include simple, one-level cluster topologies and more complicated, multi-hop topologies where an external node reaches any given decoy node through two or more real systems on the same node, two or more decoys or a combination of at least one real system and at least one decoy. The interconnection topology can be static or can be changed over time. The use of changing topologies and more complicated topologies make is more difficult for an external node to determine which of the many nodes in a MANET is a decoy and which node is a real system.

Since the actual nodes within the MANET are mobile, relative motion among nodes is a characteristic of the MANET. Therefore, the decoys created by the topology manager, in order to appear as valid, real nodes within the MANET, should also appear to be moving relative to each other and to the actual nodes within the MANET. The topology manager controls and manipulates the apparent distances among the decoys in the network so that these nodes appear to be moving relative to each other and relative to the real system on the actual node where the decoys are located. Thus, any decoy node in the MANET is indistinguishable from any actual node in the MANET by any other node except the actual node containing the real system 201 where the decoy software instance is running.

The actual node includes an access tracker 208 in communication with the topology manager. In one embodiment, the MANET includes a plurality of access trackers disposed on one or more actual nodes within the MANET. Alternatively, the MANET includes single access tracker disposed on a single actual node. In general, the access tracker monitors inter-node communication traffic and identifies any attempts to access or to establish a routing path with one of the decoys. The decoys do not initiate communication with any other node within the MANET. However, other nodes may attempt to contact the decoys for purposes of data exchange or to obtain routing table updates with the decoy. When an external node, i.e., a node other than the actual node containing the decoy software instance, attempts to obtain routing table updates from the decoy node resulting from that decoy software instance, the decoy node provides routing information to the external node indicating that the preferred path is always through the real system 200 on the actual node rather than directly between the external node and the decoy node. Path characteristic metrics between any external node and the real system 200 are selected to be better than the metrics associated with the path between the external node and the decoy node.

Figure 3:
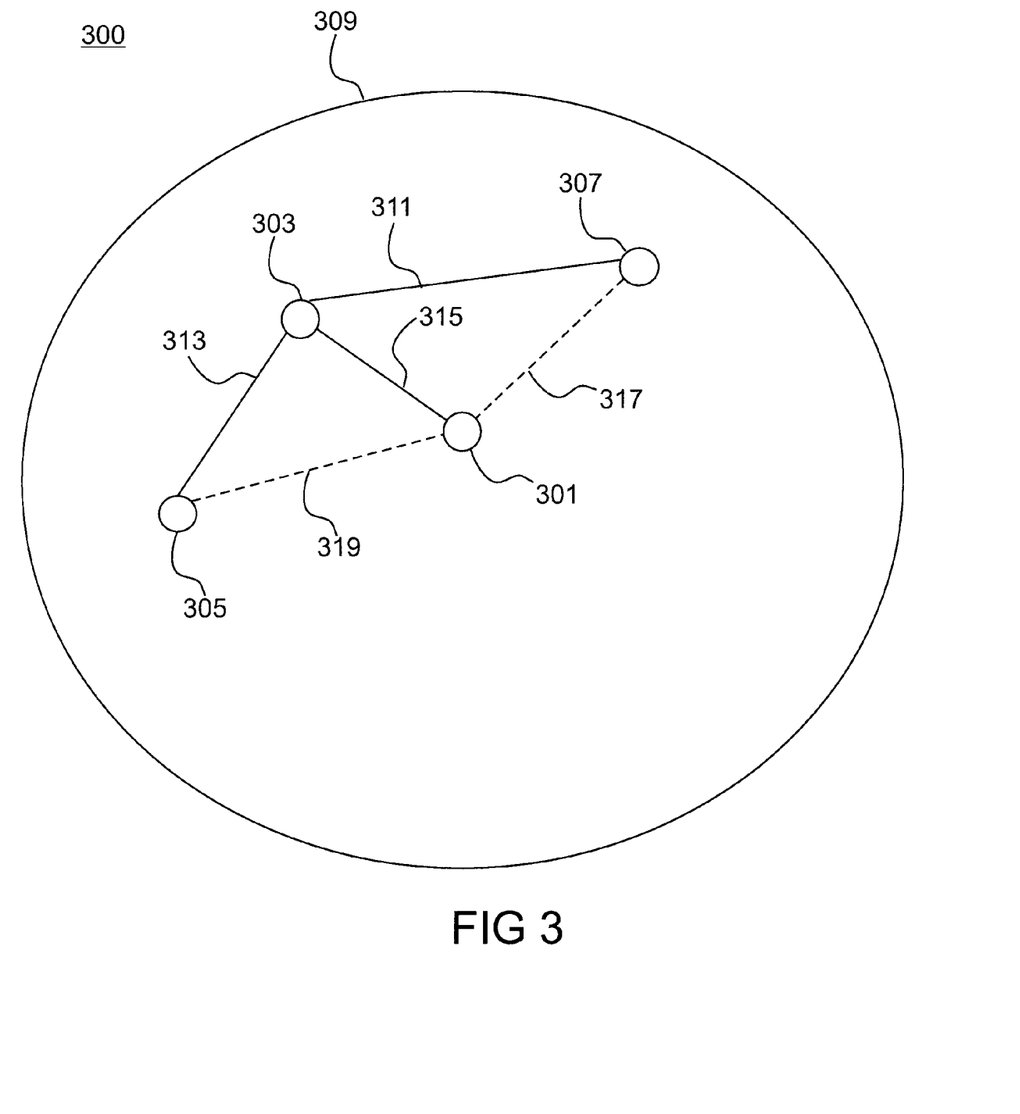
FIG. 3 is a schematic representation of an embodiment of a single node implementing the present invention.

Each one of the plurality of actual nodes, containing the real system and a plurality of decoy software instances used to create a plurality of decoy nodes, appears as a cluster of nodes within the MANET. Referring to FIG. 3, an exemplary embodiment of the cluster appearance of an actual node and its associated decoy nodes within the MANET 300 in accordance with the present invention is illustrated. As illustrated, a first node 301 within the MANET identifies a second node 303 of the MANET within its range of communication. Since the second node is an actual node that contains a plurality of decoys, the first node 301 sees not only the real system on the second node, but a cluster of nodes within its communication range including a third node 305 and a fourth node 307. The third and fourth nodes are decoys. When the first node 301 attempts to determine the connectivity characteristics with the third node 305, i.e., a decoy, the first node 301 will be provided information indicating that the link with the third node has a higher latency and a larger loss rate than the communication path between the first node 301 and the second node 303. Therefore, the link between the first and second node 315, the link between the second and third nodes 313 and the link between the second and fourth nodes 311 would be shown to have good communication characteristics. Conversely, the communication links between the first node and the third node 319 and between the first node and the fourth node 317 would be shown to have bad traffic characteristics.

The parameters of the virtual links (311, 313, 317 and 319) are selected so that any properly behaving external nodes would choose to communicate with the second actual node 303 directly and would choose to communicate with the third and fourth nodes 305, 307 indirectly through the second node 303. Exemplary methods in accordance with the present invention include mobile ad-hoc networks where at least one actual node includes a plurality of decoys. The number of decoy nodes associated with the actual node changes dynamically over time. Changes in the number of decoys include adding new decoys and the removing existing decoys from an actual node in the MANET. In order to create the desired link characteristics during the addition of new decoys to an actual node such that methods for malicious behavior detection in accordance with the present invention are supported, the appropriate link characteristics among decoys and the real system are propagated throughout the MANET to external nodes.

Figure 4:
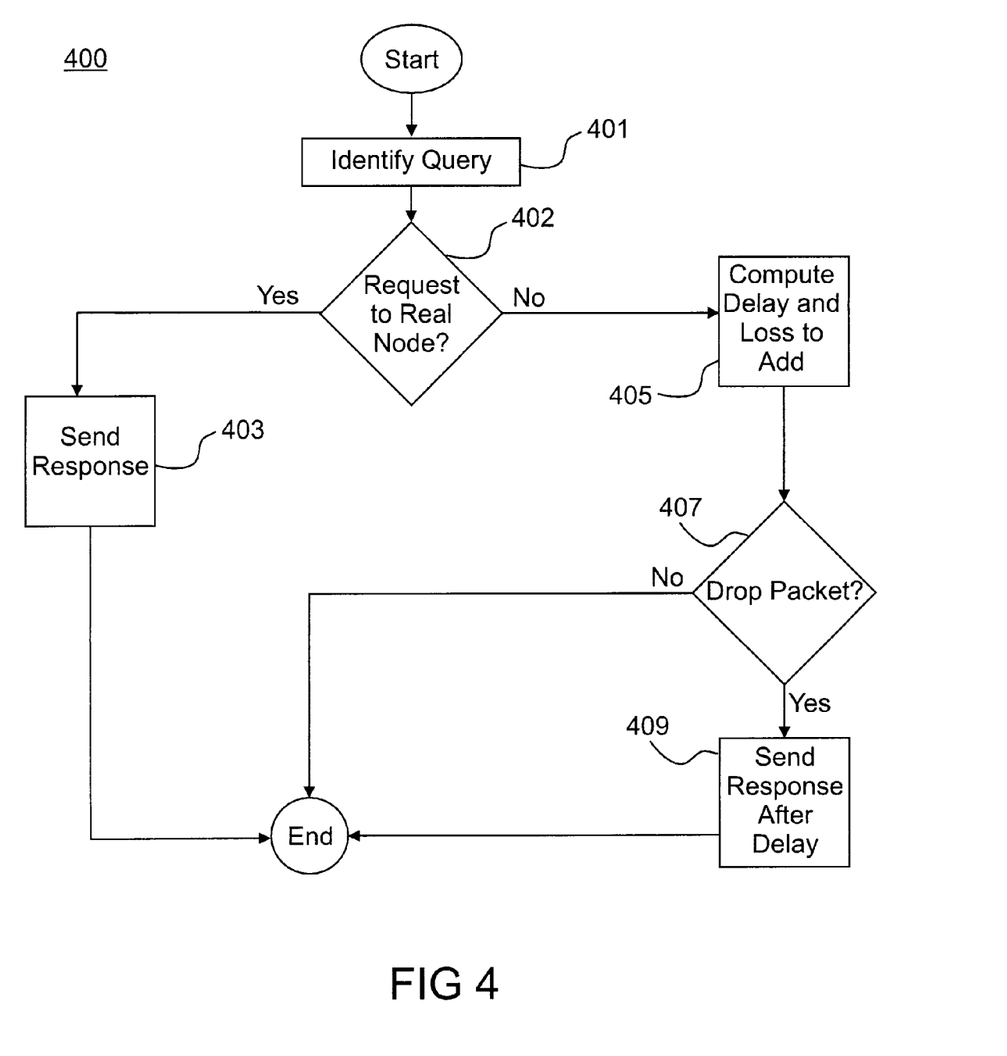
FIG. 4 is a flow chart illustrating an embodiment of method for creating link characteristics in accordance with the present invention.

Referring to FIG. 4, an exemplary embodiment of an algorithm 400 executed by the topology manager when a probe message or other query is received from a new actual node joining the MANET is illustrated. The probe message is sent to obtain the characteristics of communication links between the new actual node and any and all existing nodes within the MANET with which the new actual node can communicate. Suitable probe messages or queries from the new actual node includes an echo-request, i.e., a ping or hello message, sent between nodes. The request from the new actual node can be directed to the real system on an actual node or to decoys on that node. Initially, a query is identified 401. The topology manager on the actual node determines if the query is directed to a real system, i.e., an actual node, or to a decoy node 402. If the query is directed to a real system, a response is sent immediately 403 to the new actual node. This response includes the correct characteristics of the communication between the real system and the new actual node. Following this response, the algorithm terminates. If the query is directed to a decoy, then a random amount of delay and loss characteristics are computed for the selected query or message 405. This delay is computed so that it is significantly more than the delay associated with communications from the new actual node to the real system on an existing actual node. Based on the probability of loss, the decoy decides whether to respond to the new actual node 407. If the decoy decides to respond to the new actual node, the delay is added to the packet and sent as a response 409. In this manner, any link between a new actual node and a decoy will have a higher delay and higher loss than the communication link between the new actual node and the real system on the actual node where the decoy is located. Under normal MANET routing schemes, the routing should never occur through the decoy unless done by malicious intent.

In addition to virtual interconnection topologies created by the topology manager for the decoys that show a simple one hop topology from any given decoy to the real system on the actual node where the decoy is running, more complicated interconnection topologies can be used that have multiple decoys connected with more than one hop between them. The topology manager can also have some decoys become unavailable for random periods of time so that they become indistinguishable from other nodes in the MANET. These interconnection topologies can be static or can change overtime.

In one embodiment, the access manager observes accesses made to the nodes, both the real system on an actual node and the decoys, and determines whether or not these access attempts represent malicious behavior. Such malicious behavior can be associated with a node, and the decoys are used to identify malicious behavior in the accesses attempts. For example, a malicious node wants to route data flow traffic from other nodes in the MANET through the malicious node or to otherwise probe the MANET nodes for vulnerabilities. In one embodiment, a malicious node may be trying to send routing updates through the MANET such that the decoys will route packets directly through the malicious node rather than through the real system on the actual node associated with the decoy. Once any such routing update is observed, the malicious node can be identified. Similarly, if a node sends unexpected probe packets to the decoys, then that node is flagged as a node having malicious intent.

Figure 5:
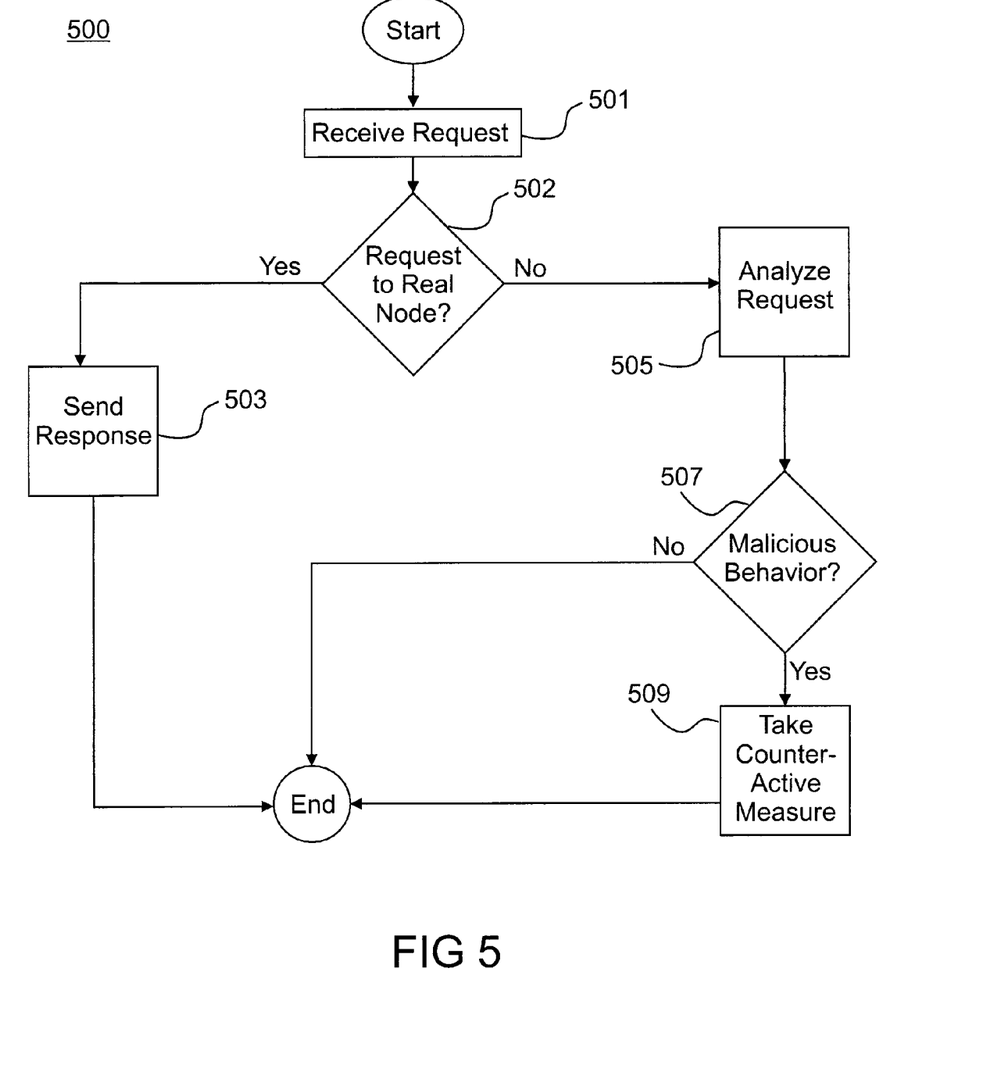
FIG. 5 is a flow chart illustrating an embodiment of a method for identifying malicious behavior in a mobile ad-hoc network in accordance with the present invention.

Referring to FIG. 5, an exemplary embodiment of an access monitoring algorithm 500 executed by the access tracker in accordance with the present invention is illustrated. A request is received 501 from a node, e.g., an external node, and is directed to one of the actual nodes or decoys in the MANET. A determination is made by the access tracker disposed on the node receiving the request regarding whether or not the request is directed to the actual node or to a decoy 502, for example one of the decoys established from the decoy operating software of the actual node receiving the request. The actual node or decoy could also be other actual nodes or unrelated decoys when more complicated interconnection topologies are used. If the received system request is directed to an actual node, a response is sent from the actual node to the requesting external node 503, and the algorithm terminates.

If the request is to a decoy, the access tracker analyzes the received requests 505 to determine the exact type and content of the received request. The analysis is used to determine if the received request is malicious or not. Accesses that are trying to send an illegal routing update or trying to access a random port on the decoy node are examples of malicious behavior. A message trying to access an unadvertised port on the decoy is another example of malicious behavior. A sequence of messages trying to access a sequence of ports on the decoy in another example of malicious behavior. This malicious behavior, however, involves a plurality of messages. Based on the request analysis, the access tracker determines whether or not the received request represents malicious behavior 507. If the request does not represent malicious behavior, the packet is processed normally. If the received message is determined to be malicious behavior, then the access tracker initiates counteractive measures 509. Example of counteractive measures include, but are not limited to, setting up access filters so that all communication from the malicious node is blocked and or using a reputation based system to give the malicious node a bad reputation that is forwarded to all actual nodes in the MANET. Other examples of counteractive measures include reporting the malicious node to a higher level network management console, or to launch a denial of service attack on the malicious node.

Methods and systems in accordance with exemplary embodiments of the present invention can take the form of an entirely hardware embodiment, an entirely software embodiment or an embodiment containing both hardware and software elements. In a preferred embodiment, the invention is implemented in software, which includes but is not limited to firmware, resident software and microcode. In addition, exemplary methods and systems can take the form of a computer program product accessible from a computer-usable or computer-readable medium providing program code for use by or in connection with a computer, logical processing unit or any instruction execution system. For the purposes of this description, a computer-usable or computer-readable medium can be any apparatus that can contain, store, communicate, propagate, or transport the program for use by or in connection with the instruction execution system, apparatus, or device. Suitable computer-usable or computer readable mediums include, but are not limited to, electronic, magnetic, optical, electromagnetic, infrared, or semiconductor systems (or apparatuses or devices) or propagation mediums. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Suitable data processing systems for storing and/or executing program code include, but are not limited to, at least one processor coupled directly or indirectly to memory elements through a system bus. The memory elements include local memory employed during actual execution of the program code, bulk storage, and cache memories, which provide temporary storage of at least some program code in order to reduce the number of times code must be retrieved from bulk storage during execution. Input/output or I/O devices, including but not limited to keyboards, displays and pointing devices, can be coupled to the system either directly or through intervening I/O controllers. Exemplary embodiments of the methods and systems in accordance with the present invention also include network adapters coupled to the system to enable the data processing system to become coupled to other data processing systems or remote printers or storage devices through intervening private or public networks. Suitable currently available types of network adapters include, but are not limited to, modems, cable modems, DSL modems, Ethernet cards and combinations thereof.

In one embodiment, the present invention is directed to a machine-readable or computer-readable medium containing a machine-executable or computer-executable code that when read by a machine or computer causes the machine or computer to perform a method to detect malicious behavior in a mobile ad-hoc network in accordance with exemplary embodiments of the present invention and to the computer-executable code itself. The machine-readable or computer-readable code can be any type of code or language capable of being read and executed by the machine or computer and can be expressed in any suitable language or syntax known and available in the art including machine languages, assembler languages, higher level languages, object oriented languages and scripting languages. The computer-executable code can be stored on any suitable storage medium or database, including databases disposed within, in communication with and accessible by computer networks utilized by systems in accordance with the present invention and can be executed on any suitable hardware platform as are known and available in the art including the control systems used to control the presentations of the present invention.

While it is apparent that the illustrative embodiments of the invention disclosed herein fulfill the objectives of the present invention, it is appreciated that numerous modifications and other embodiments may be devised by those skilled in the art. Additionally, feature(s) and/or element(s) from any embodiment may be used singly or in combination with other embodiment(s) and steps or elements from methods in accordance with the present invention can be executed or performed in any suitable order. Therefore, it will be understood that the appended claims are intended to cover all such modifications and embodiments, which would come within the spirit and scope of the present invention.

What is claimed is:

1. A method to detect malicious behavior in a mobile ad-hoc network, the method comprising:
    establishing a decoy instance of actual node operating software on an actual node in a mobile ad-hoc network, the decoy instance comprising a copy of the actual node operating software running on the actual node and configured to appear as an actual separate physical node in the mobile ad-hoc network;
    generating routing information indicating that communication paths directly between nodes external to the mobile ad-hoc network and the decoy instance comprise higher latency and larger loss rates than communication paths between the external nodes and the decoy instance that pass through a real system instance of the node operating software on the actual node;
    communicating the generated routing information to the external nodes; monitoring communications involving the decoy instance and the external nodes; and
    detecting attempted routing by the external nodes of communication paths directly between the external nodes and the decoy instance in contradiction to the communicated routing information that indicates malicious behavior within the mobile ad-hoc network.

2. The method of claim 1, wherein the step of establishing the decoy instance of the operating software further comprises establishing a plurality of decoy instances of the actual node operating software on the actual node.

3. The method of claim 1, wherein the step of establishing the decoy instance further comprises using a hypervisor disposed on the actual node to establish the decoy instance of the operating software.

4. The method of claim 2, further comprising creating a virtual interconnection topology comprising the plurality of decoy instances in the mobile ad-hoc network.

5. The method of claim 4, wherein the step of creating the virtual interconnection topology further comprises creating an appearance of relative motion between two decoy nodes comprising two decoy instances in the plurality of decoy instances.

6. The method of claim 4, wherein the step of creating the virtual interconnection topology further comprises modifying characteristics of the virtual interconnection topology.

7. The method of claim 1, wherein the step of establishing the decoy instance further comprises establishing a communication routing scheme among the external nodes and the decoy instance in the mobile ad-hoc network such that the most efficient path for the external nodes to communicate with the decoy passes through a real system instance of the node operating software on the actual node on which the decoy instance is established.

8. The method of claim 1, wherein the step of monitoring communications involving the established decoy instance to identify malicious activity further comprises identifying attempts to communicate with the decoy instance in violation of an established communication routing scheme.

9. The method of claim 1, wherein the step of monitoring communications involving the established decoy to identify malicious behavior further comprises identifying a malicious node within the mobile ad-hoc network that is associated with the malicious behavior.

10. The method of claim 9, further comprising quarantining the identified malicious node, establishing access filters between the identified malicious node and other nodes in the mobile ad-hoc network, associating a reputation with the identified malicious node indicating that the malicious node is not a trusted node or combinations thereof.

11. The method of claim 1, further comprising tracking access to the decoy instance when a new actual node is added to the mobile ad-hoc network.

12. The method of claim 11, wherein the step of tracking access to the decoy instance when a new actual node is added further comprises:
communicating actual delay and loss characteristics to the new node for communications between the new node and a real system instance of the node operating software on an actual node in the mobile ad-hoc network; and
communicating modified delay and loss characteristics to the new node for
communications between the new node and the decoy instance, the modified delay and loss characteristics comprising an added amount of delay and loss such that the modified delay and loss characteristics exceeds the actual delay and loss characteristics for communications between the new node and the real system instance on the actual node.

13. A method to detect malicious behavior in a mobile ad-hoc network, the method comprising:
establishing a plurality of decoy instances of actual node operating software on one of a plurality of actual nodes in a mobile ad-hoc network, each decoy instance comprising a copy of actual node operating software running one of the actual nodes and configured to appear as an actual separate physical node in the mobile ad-hoc network;
creating a virtual interconnection topology among the plurality of decoy instances and the plurality of actual nodes in the mobile ad-hoc network, the virtual interconnection topography facilitating the manipulation of apparent distances among the decoy instances and the actual nodes to yield an appearance of actual relative motion among the decoy instances and the actual nodes;
generating routing information indicating that communication paths directly between nodes external to the mobile ad-hoc network and the decoy instances comprise higher latency and larger loss rates than communication paths between the external nodes and the decoy instances that pass through a real system instance of the node operating software on the actual nodes;
communicating the generated routing information to nodes external to the mobile ad-hoc network;
using the established decoy instances and the virtual interconnection topology to identify accesses made to the decoy instances from the external nodes; and
detecting attempted routing by the external nodes of communication paths directly between the external nodes and the decoy instances in contradiction to the communicated routing information that indicates malicious behavior within the mobile ad-hoc network.

14. The method of claim 13, wherein the virtual interconnection topology comprises communication links to one or more of the decoy instances such that the communication links comprise at least one of a plurality of real system instances on actual nodes, a plurality of decoy instances or at least one real system instance on an actual node and at least one decoy instance.

15. A physical node in a computing system in a mobile ad-hoc network, the node comprising:
a processor and a memory;
at least one real system instance of the operating software for the node;
at least one decoy instance of the operating software, the decoy instance configured to appear as an actual separate physical node in the mobile ad-hoc network;
creating a virtual interconnection topology among the plurality of decoy instances and the plurality of actual nodes in the mobile ad-hoc network, the virtual interconnection topography facilitating the manipulation of apparent distances among the decoy instances and the actual nodes to yield an appearance of actual relative motion among the decoy instances and the actual nodes; generating routing information indicating that communication paths directly between nodes external to the mobile ad-hoc network and the decoy instances comprise higher latency and larger loss rates than communication paths between the external nodes and the decoy instances that pass through a real system instance of the node operating software on the actual nodes;
communicating the generated routing information to nodes external to the mobile ad-hoc network;
using the established decoy instances and the virtual interconnection topology to identify accesses made to the decoy instances from the external nodes and detecting attempted routing by the external nodes of communication paths directly between the external nodes and the decoy instances in contradiction to the communicated routing information that indicates malicious behavior within the mobile ad-hoc network.

16. The node of claim 15, further comprising a plurality of decoy instances of the operating software.

17. The node of claim 16, further comprising a virtual interconnection topology among the decoy instances and the real system instance of the operating software.

18. A non-transitory computer-readable medium containing a computer-readable code that when read by a computer causes the computer to perform a method to detect malicious behavior in a mobile ad-hoc network, the method comprising:
establishing a decoy instance of actual node operating software on an actual node in a mobile ad-hoc network, the decoy instance comprising a copy of the actual node operating software running on the actual node and configured to appear as an actual separate physical node in the mobile ad-hoc network;
generating routing information indicating that communication paths directly between nodes external to the mobile ad-hoc network and the decoy instance comprise higher latency and larger loss rates than communication paths between the external nodes and the decoy instance that pass through a real system instance of the node operating software on the actual node;

communicating the generated routing information to the external nodes;

monitoring communications involving the decoy instance and the external nodes; and detecting attempted routing by the external nodes of communication paths directly between the external nodes and the decoy instance in contradiction to the communicated routing information that indicates malicious behavior within the mobile ad-hoc network.

19. The non-transitory computer-readable medium of claim 18, wherein the step of establishing the decoy instance of the operating software further comprises establishing a plurality of decoy instance of the actual node operating software on the actual node.

20. The non-transitory computer-readable medium of claim 19, wherein the method further comprises creating a virtual interconnection topology comprising the plurality of decoy instances in the mobile ad-hoc network.

* * * * *